United States Patent
Caldwell et al.

(10) Patent No.: US 7,391,760 B1
(45) Date of Patent: Jun. 24, 2008

(54) METHOD AND APPARATUS FOR EFFICIENT PROTOCOL-INDEPENDENT TRUNKING OF DATA SIGNALS

(75) Inventors: Alan B. Caldwell, Nepean (CA); Glenn G. Algie, Ottawa (CA); Jozef Z. Babiarz, Stittsville (CA)

(73) Assignee: Nortel Networks Limited, Research Triangle Park, NC (US)

( * ) Notice: Subject to any disclaimer, the term of this patent is extended or adjusted under 35 U.S.C. 154(b) by 1402 days.

(21) Appl. No.: 09/642,108

(22) Filed: Aug. 21, 2000

(51) Int. Cl.
*H04L 12/66* (2006.01)
*H04L 12/28* (2006.01)
*H04L 12/56* (2006.01)
*H04J 3/24* (2006.01)

(52) U.S. Cl. .................. 370/352; 370/356; 370/401; 370/474

(58) Field of Classification Search .............. 370/400, 370/465, 466, 395.1, 352, 353, 474
See application file for complete search history.

(56) References Cited

U.S. PATENT DOCUMENTS

| | | | | |
|---|---|---|---|---|
| 5,619,500 | A * | 4/1997 | Hiekali | 370/414 |
| 5,623,605 | A * | 4/1997 | Keshav et al. | |
| 5,757,775 | A * | 5/1998 | Yokoyama et al. | 370/242 |
| 5,802,068 | A * | 9/1998 | Kudo | 370/538 |
| 5,936,965 | A | 8/1999 | Doshi et al. | 370/469 |
| 6,125,117 | A * | 9/2000 | Martin et al. | 370/397 |
| 6,151,318 | A * | 11/2000 | Woodward et al. | 370/392 |
| 6,259,691 | B1 * | 7/2001 | Naudus | 370/352 |
| 6,339,597 | B1 * | 1/2002 | Osaki | 370/395.65 |
| 6,452,950 | B1 * | 9/2002 | Ohlsson et al. | 370/516 |
| 6,477,164 | B1 * | 11/2002 | Vargo et al. | 370/356 |
| 6,522,667 | B1 * | 2/2003 | Oda et al. | 370/474 |
| 6,606,306 | B1 * | 8/2003 | Lin et al. | 370/261 |
| 6,628,678 | B2 * | 9/2003 | Temple et al. | 370/536 |
| 6,721,334 | B1 * | 4/2004 | Ketcham | 370/473 |
| 7,136,377 | B1 * | 11/2006 | Tweedly et al. | 370/356 |

OTHER PUBLICATIONS

IETF Internet Draft: L2TP Circuit Emulation Services Extension (May 2000) Danny McPherson; Ravi Bail Bhat; Andy Koscinski; Chi Fai Ho.
IETF Internet Draft: The 'Virtual Wire' Behavior Aggregate (Mar. 2000) Expired Aug. 2000. Van Jacobson; Kathleen Nichols; Kedar Poduri.
Product Description: ASR2000 Aggregation Service Router Amber Networks.

* cited by examiner

*Primary Examiner*—Daniel J. Ryman
(74) *Attorney, Agent, or Firm*—Ogilvy Renault LLP (57) ABSTRACT

A method and apparatus for protocol-independent extension of data services through a broadband packet network packs legacy data streams associated with the data services into containers which are in turn encapsulated in protocol data units (PDUs) that are launched into the broadband packet network. The apparatus optimally supports idle suppression to efficiently utilize packet network resources. If idle indications are not provided by subtending sources, idle patterns may be detected by examining the serial data stream for repeating data patterns. The containers have headers dependent on the data stream type. Thus data is only transported across the packet network as required, further improving efficiency.

91 Claims, 5 Drawing Sheets

METHOD AND APPARATUS FOR EFFICIENT PROTOCOL-INDEPENDENT TRUNKING OF DATA SIGNALS

CROSS-REFERENCE TO RELATED APPLICATIONS

This is the first application filed for the present invention.

MICROFICHE APPENDIX

Not applicable.

TECHNICAL FIELD

The present invention relates to digital communications networks, and in particular to a method and apparatus enabling efficient protocol-independent extension of data services through a broadband packet network.

BACKGROUND OF THE INVENTION

Communication networks are constructed using network models and transfer protocols as guides. Network models and transfer protocols have proliferated over the past few years as new networks have been developed (and existing networks have evolved) to accommodate new end-user, device and application requirements.

The proliferation of network models has focused on monolithic, highly integrated network and network component architectures. Data services (e.g. functionality and products) developed for a network that supports a target group of end-users, devices or applications are usually available only within the geographical reach of that network, and are not easily extendible to another network without extensive modification or complete re-creation. Adding new functionality to installed networks requires complex modifications or overlays to the existing functionality. Conversely, new networks cannot capitalize on functionality and protocols developed for legacy networks, because monolithic integrated designs do not permit porting without complex protocol conversion interfaces. The time required to implement such modifications is incompatible with the modern competitive communications business environment, where the time to market can significantly influence market share. At the same time, the costs associated with installing new network equipment can pose a significant impediment to the deployment of modern network services. For example, many firms (typically those with multiple branch locations) have deployed enterprise networks linking their various branches via lines leased from a network service provider. Legacy enterprise networks of this type were commonly constructed based on any of the X.25, Frame Relay (FR), or Integrated Services Digital Network (ISDN) protocols, and usually involved substantial investment in networking equipment. This investment may make the firm reluctant to incur the cost of new equipment required to utilize modern broadband packet network architectures (e.g. ATM or XGb Ethernet or Internet Protocol [IP]), in spite of the various advantages offered by the newer architecture to the firm and/or the network service provider.

As a result, the present communications network space is a patchwork of modern and legacy networks, each operating under respective network models and transfer protocols (e.g. Ethernet, Time Division Multiple Access (TDMA), frame relay (FR), synchronous transfer mode (STM), asynchronous transfer mode (ATM), X.25, SNA, Video, Transfer Control Protocol/Internet Protocol (TCP/IP) etc.); utilizing different transport media (e.g. copper, fiber, wireless etc.); and frequently owned by different business entities. Networks may be edge-connected by means of gateway interfaces, permitting transport of data between the networks. However, where such networks are dissimilar, adaptation is required to facilitate the transport of data across the networks. In the context of the present invention, adjoining networks are considered to be "dissimilar" or "heterogeneous" if their respective network models, transfer protocols and/or media are sufficiently different that data streams originating in one network cannot be transported by an adjoining network without conversion or reformatting. Such conversion, referred to herein as "adaptation", is an automated process to enable the transfer of data across the heterogeneous networks.

For example, a firm may operate a legacy enterprise network comprising a site network at each of its various branch locations, and utilizing frame relay for inter-site communications over leased lines provided by a network service provider. The network service provider may wish to extend the frame relay service through an ATM backbone network, in order to take advantage of the superior data transport capabilities of the ATM backbone. Such service extension requires adaptation of data at gateways between the ATM network and each of the involved site networks. Thus data originating in each site network (and conforming to the FR protocol) must be adapted to conform to the ATM protocol before it can be transported across the ATM backbone. Similarly, data arriving at a site network through the ATM backbone must be adapted to conform to the FR protocol before the data is delivered to the site network.

Adaptation to facilitate data service extension scenarios of this type is typically performed in gateway servers provided for that purpose, usually as part of a data services solution specifically engineered to the requirements of the customer. Both of these factors tend to increase costs and reduce flexibility, thereby creating an impediment to their widespread deployment.

Applicants co-pending U.S. patent application Ser. No. 09/158,855, entitled TRANSIT TRUNK SUBNETWORK, which was filed on Sep. 23, 1998, teaches a method of inter-office trunking of PCM signals through an ATM backbone. A PCM data stream received at an ingress gateway is packed into ATM cells having a predetermined length. The ATM cells are transported through the ATM backbone, e.g. over a switched virtual circuit (SVC), to an egress gateway. The egress gateway extracts the data from the ATM cells to recover the original PCM signal.

ATM SVCs are particularly adapted for trunking circuit-switched data streams, because ATM guarantees delivery of each cell, and ensures that cell-ordering is maintained. Thus ATM can readily satisfy the QoS requirements of connection-oriented traffic without excess overhead. However, in some cases it may be desirable to provide trunking through other packet-based networks (such as IP, Ethernet or wireless), in which QoS guarantees may not necessarily be provided. Additionally, the efficiency of utilization of resources within a data packet network used to transport circuit-switched data can also be comparatively low. In particular, trunking facilities are normally provisioned for peak utilization periods. This means that at any given time, some, or possibly most of the channels within a circuit-switched trunk may be idle. However, in order to facilitate recovery of the circuit-switched signals at an egress gateway, the entire trunk signal, including the idle channels, must be transported across the packet data network. This means that at least some of the packets (e.g. ATM cells, IP packets or Ethernet frames) carry null data.

U.S. Pat. No. 5,936,965, which issued to Doshi et al. on Aug. 10, 1999 teaches a system for supporting the transmission of multiple application-layer protocols through a single link using a single byte-stream. The multiple application-layer protocol types supported include asynchronous transfer mode (ATM) protocol data units (PDUs), synchronous transfer mode (STM) PDUs, and variable length (VL) PDUs, as well as subtypes included within these protocol types. Application-layer PDUs are processed at three intermediate protocol layers where the application layer PDUs are prepared, segmented, and repacked as asynchronous block multiplexing (ABM) PDUs. ABM PDUs include a type identification field. Cyclical redundancy checks and other error detection/correction techniques are optionally supported. ABM PDUs are multiplexed within a multiple protocol byte-stream. Multiple protocol byte-stream support is provided through a single link between a transmitter and receiver using a plurality of media, including coaxial cable, wireless, optical fiber, hybrid fiber/coax, satellite, and twisted pair.

Thus the system taught by Doshi et al. is designed to operate in modern networks constructed using a data packet model and a layered architecture. Furthermore, Doshi et al. propose a proprietary ABM PDU format that is not supported by current network standards. Accordingly, the system of Doshi et al. can only operate on proprietary PHY-layer equipment, and thus is incapable of transporting data using the existing network infrastructure. Finally, Doshi et al. do not address the problem of adapting multiple legacy circuit-switched data streams for transport through a data packet network.

Accordingly, a method and apparatus that enables the protocol-independent extension of data services through a broadband packet network with efficient utilization of packet network resources, remains highly desirable.

SUMMARY OF THE INVENTION

An object of the present invention is to provide a universal, i.e. protocol-independent, method and apparatus for enabling extension of data services through a broadband packet network.

Accordingly, an aspect of the invention provides a method of extending a data service through a broadband packet network. A data stream respecting the data service is received at an ingress gateway. The data stream is encapsulated within a container, which is then encapsulated within a protocol data unit (PDU) of the broadband packet network. The PDU is then forwarded through the broadband packet network to an egress gateway.

A further aspect of the invention provides an apparatus for extending a data service through a broadband packet network. The apparatus includes: means for receiving a data stream respecting the data service at an ingress gateway; means for encapsulating the data stream within a container; means for encapsulating the container within a protocol data unit (PDU) of the broadband packet network; and means for forwarding the PDU through the broadband packet network to an egress gateway.

Another aspect of the present invention provides an apparatus for extending a data service through a broadband packet network. The apparatus includes: means for receiving sequential PDUs of the broadband packet network at an egress gateway from an ingress gateway; means for extracting a respective container from each received PDU; and means for reconstructing a data stream respecting the data service using the respective containers.

Another aspect of the present invention provides a system for extending a data service through a broadband packet network. The system includes an ingress gateway and egress gateway. The ingress gateway includes: means for receiving a data stream respecting the data service; means for encapsulating the data stream within a container; and means for encapsulating the container within a protocol data unit (PDU) of the broadband packet network. Means are provided for conveying the PDU through the broadband packet network from the ingress gateway to the egress gateway. The egress gateway includes: means for extracting a respective container from each received PDU; and means for reconstructing the data stream using the respective containers.

In embodiments of the invention, encapsulation of the data stream comprises the steps of: accumulating a payload packet comprising a predetermined number of accumulated bytes of the data stream; and encapsulating the payload packet within the container.

The broadband packet network may be based on any one or more of the UDP/IP, TCP/IP, IP-MPLS, ATM, Ethernet and DOCSIS protocols, and the data stream may be formatted in accordance with any other communications protocol.

In some embodiments of the invention, a communications protocol of the data stream is known. In such cases, the predetermined number of bytes of the data stream forming each payload packet is preferably a function of the format of the data stream.

In embodiments in which the data stream is a known circuit-switched data stream comprising pulse code modulated PCM signals, the number of accumulated bytes forming each payload packet is determined by a number of channels and number of frames (or multi-frames or superframes) of the data stream. For example, In cases where the data stream is made up of Channel Associated Signaling, then the number of accumulated bytes forming each payload packet is preferably a function of the multi-frame count. In some embodiments, the number of accumulated bytes forming each payload packet may be equivalent to $$Ps=(Nc \times Nm) \times n$$

Where:
Ps=payload packet size;
Nc=number of channels;
Nm=number of frames (or superframes or multi-frames); and
n=an integer.

In other embodiments of the invention, the data stream is a known packet data stream comprising sequential PDU's of a packet network protocol. In such cases, the number of bytes forming each payload packet is preferably an integer multiple of a number of bytes forming each PDU of the packet network protocol.

In some embodiments of the invention, a communications protocol of the data stream is unknown.

In embodiments of the invention, accumulation of a payload packet may include: detecting an idle pattern; and when an idle pattern is detected, discarding bytes of the data stream corresponding to the detected idle pattern. The idle pattern may be known.

A known idle pattern may be embedded within the data stream, in which case the step of detecting the idle pattern may include a step of monitoring successively received bytes of the data stream to detect the idle pattern. Alternatively, a known idle pattern may be a stimulus external to the data stream. The idle pattern may be indicative of an idle channel within the data stream, and bytes within the indicated idle channel of the data stream can be discarded.

In embodiments of the invention, an idle notification is forwarded to the egress gateway. The idle notification preferably comprises information identifying detected idle patterns and corresponding idle channels. The idle notification may be forwarded within the container, or alternatively may be forwarded within a notification message independently of the container.

In embodiments of the invention, the idle pattern in unknown. In such cases, detection of an idle pattern preferably comprises monitoring each successive payload packet to detect a repeating pattern indicative of an idle condition of the data stream. The step of discarding bytes of the data stream may include discarding each successive payload packet in which the repeating pattern is detected. The steps of encapsulating payload packets within containers, encapsulating containers within PDUs and forwarding the PDUs to the egress gateway may be interrupted, and an idle notification sent to the egress gateway. Successive payload packets can then be monitored to detect the repeating pattern; and the steps of encapsulating payload packets within containers, encapsulating containers within PDUs and forwarding PDUs to the egress gateway can be resumed when the repeating pattern is no longer detected.

In embodiments of the invention, a sequence number is inserted into each successive container. At least one sequence number may a reserved sequence number used to indicate a start of the data stream.

In embodiments of the invention, sequential PDUs of the broadband packet network are received at the egress gateway from the ingress gateway. A respective container is extracted from each received PDU, and the data stream reconstructed using the respective containers.

Reconstruction of the data stream may comprise the steps of: buffering each container in a jitter buffer; extracting a respective payload packet from each container; and appending each extracted payload packet to a payload packet of a previous container to reconstruct the data stream. The buffered containers may be sorted based on a respective sequence number of each container. The respective sequence numbers of each buffered container may be monitored to detect a missing container. If a missing container is detected, a null payload packet may be appended to a previous payload packet of the reconstructed data stream. The null payload packet may include AB-bits duplicated from the previous payload packet of the reconstructed data stream.

In embodiments of the invention, an inter-packet delay period is monitored between successively received PDU's. A length of the jitter buffer can then be adjusted based on the inter-packet delay. The length of the jitter buffer is preferably adjusted during an idle period of the data stream.

In embodiments of the invention, reconstruction of the data stream includes receiving an idle notification from the ingress gateway. The idle notification may include information identifying one or more of an idle indication and a corresponding idle channel of the data stream received by the ingress gateway, and the step of reconstructing the data stream further comprises a step of inserting null data into the corresponding idle channel of the reconstructed data stream following receipt of the idle indication. The null data may include the idle indication.

The idle notification may comprise an indication of an idle condition of the data stream received by the ingress gateway. In such cases, reconstructing the data stream may include any one or more of duplicating a last received payload packet, and inserting a provisioned idle pattern.

The idle notification may be received by the egress gateway encapsulated within a container, or alternatively may be received by the egress gateway within a notification message independently of a container.

Reconstruction of the data stream may resume based on containers extracted from received PDU's upon receipt of a container having a predetermined reserved sequence number.

An advantage of the present invention is that encapsulation of the data stream within containers renders the broadband packet network transparent to the source of the data stream (e.g. an enterprise site network), to thereby provide protocol-independent service extension through the broadband packet network. At the same time, idle suppression reduces congestion within the broadband packet network by substantially eliminating the transport of null data.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
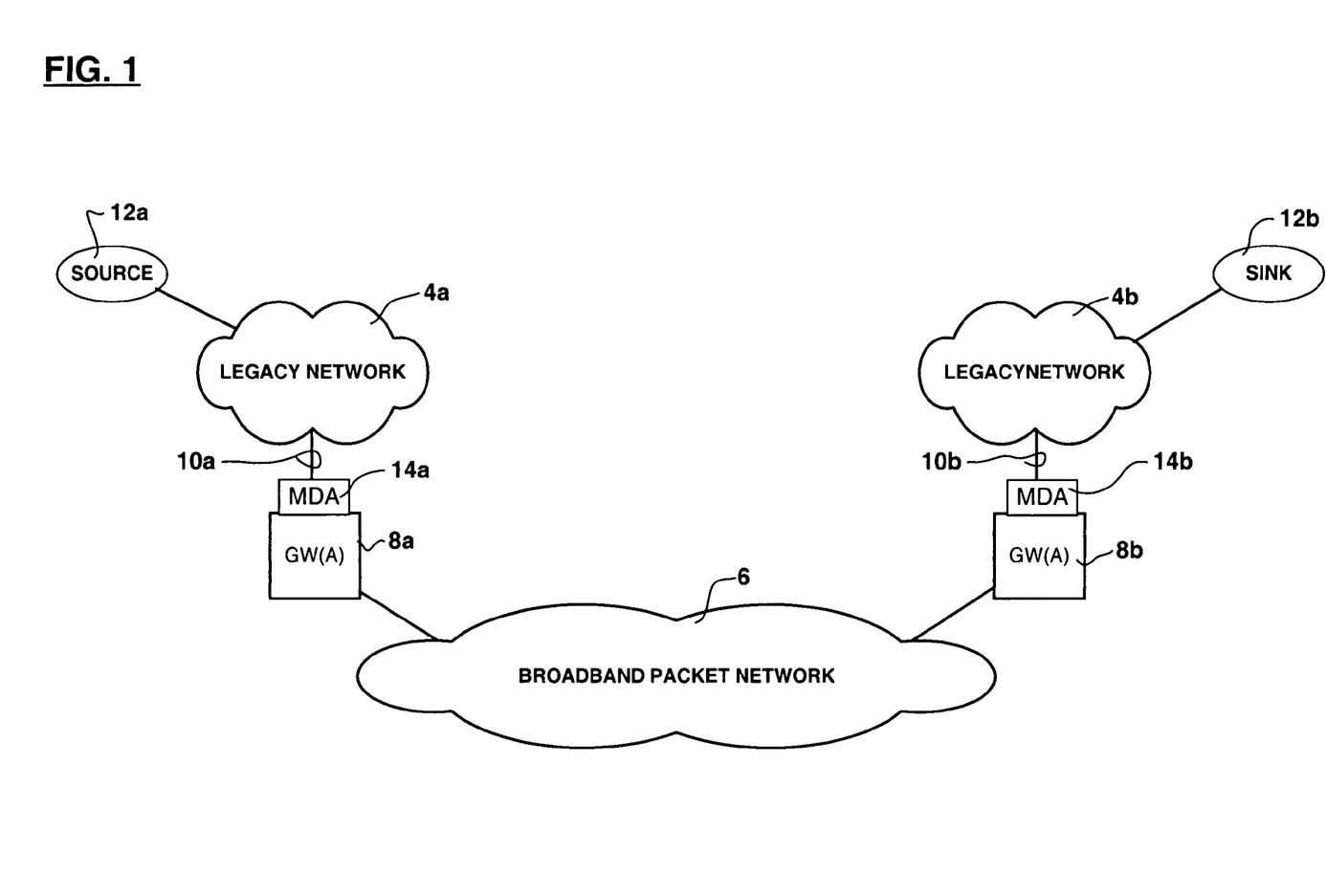
FIG. 1 is a block diagram schematically illustrating an exemplary communications network within which the present invention may be deployed.

The present invention provides a method and apparatus which enables universal (i.e. protocol independent) extension of data services across a broadband packet network by transparently conveying data streams associated with such data services through the broadband packet network. FIG. 1 illustrates an exemplary communications network 2 within which the present invention may be deployed. In the embodiment illustrated in FIG. 1, a pair of legacy networks 4a,4b are connected to a broadband packet network 6 via respective gateways 8a,8b. The legacy networks 4a,4b may be, for example, respective domains of the PSTN, enterprise site networks, or physical connections to communications devices (e.g. a Plain Old Telephone Service [POTS] loop serving a telephone handset). Similarly, the legacy networks 4a,4b may operate in accordance with any legacy circuit-switched or packet-based communications protocol (e.g. E1, T1, SNA, video, FR, ISDN etc.). Each gateway 8 is coupled to its respective legacy network 4a,4b via one or more physical interfaces 10a,10b, conforming to the connection standard applicable to the legacy network 4. The broadband packet network 6 may be any packet based network infrastructure including, wireless, optical fiber, co-axial cable hybrid fiber/coax, or twisted pair, and using any of the packet based communication protocols (e.g. IP, ATM, Ethernet).

In practice, selection of the physical interface 10 between each gateway 8 and its respective legacy network 4 will be determined by provisioning, and thus the format of legacy data streams originating within these legacy networks 4 (e.g. unaligned, frame aligned, and multi-frame aligned) are known in advance. Similarly, the architecture and transport protocols of the broadband packet network 6 are determined by provisioning, and thus are known in advance. For the purposes of the present invention, it is assumed that issues of authentication, verification of service configuration, and data stream connectivity are handled by known methods. Thus, for example, for a trunked connection through the broadband packet network 6 between originating and destination points 12a,12b, it is assumed that known methods are utilized to set up a connection between the originating point 12a and a first (i.e. ingress) gateway 8a. It is also assumed that known methods are used to set up a connection between the destination point 12b and a second (i.e. egress) gateway 8b, and to establish signaling between the two gateways 8a,8b through the broadband packet network 6. It is further assumed that compatible versions of signal processing algorithms in accordance with the present invention are operative within each of the gateways 8a,8b so that signal adaptation can be performed properly in each gateway 8a,8b. Within this context, the apparatus of the present invention may be provided as a medium dependent adapter (MDA) 14 which may be coupled to the physical interface 10a, 10b of each gateway 8a,8b so as to mediate traffic flow between the respective gateways 8a, 8b and legacy networks 4a,4b.

As will be described in greater detail below, the method of the present invention may be implemented either with, or without idle suppression. In embodiments of the invention in which idle suppression is implemented, it is possible to base the idle suppression functionality on either known (e.g., provisioned) idle patterns or discovered idle patterns, or both.

It will be appreciated that trunked data streams are typically bi-directional. However, in order to facilitate understanding of the present invention, and to simplify the present discussion, a first one of the gateways 8a,8b will be referred to as an ingress gateway 8a in which a received legacy data stream is packetized and launched into the broadband packet network. Similarly, a second one of the gateways 8a,8b is referred to as an egress gateway 8b in which received PDUs are processed to extract encapsulated payload packets which are assembled to regenerate the original legacy data stream.

Figure 2:
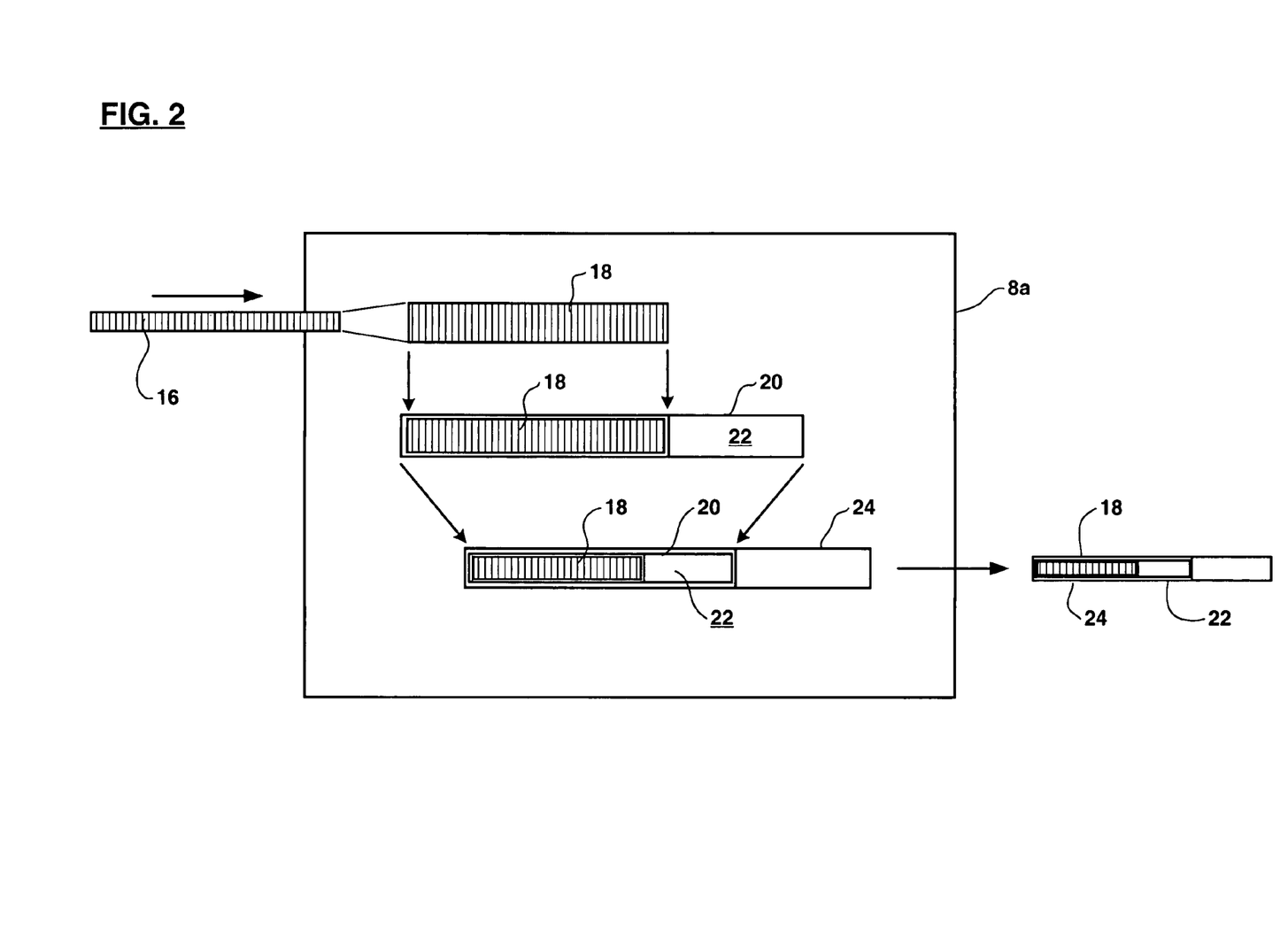
FIG. 2 is a block diagram schematically illustrating encapsulation of a circuit-switched data stream for transport across the broadband packet network of FIG. 1.

In general, the present invention provides protocol independent adaptation services between legacy data streams and protocol data units (PDUs) of the broadband packet network. This is accomplished by treating a legacy data stream received at the ingress server 8a as a serial byte stream. As shown in FIG. 2, the serial byte stream 16 is split into successive packets 18, which may be of arbitrary size. The packets are inserted into respective containers 20. Each container 20 includes a header portion 22 that conveys data usable by the egress gateway 8b for processing received containers 20 to regenerate the serial byte stream 16. In order to transport the containers 20 across the broadband packet network 6, each container is inserted into a respective protocol data unit (PDU) 24 of the broadband packet network in a conventional manner.

Figure 3:
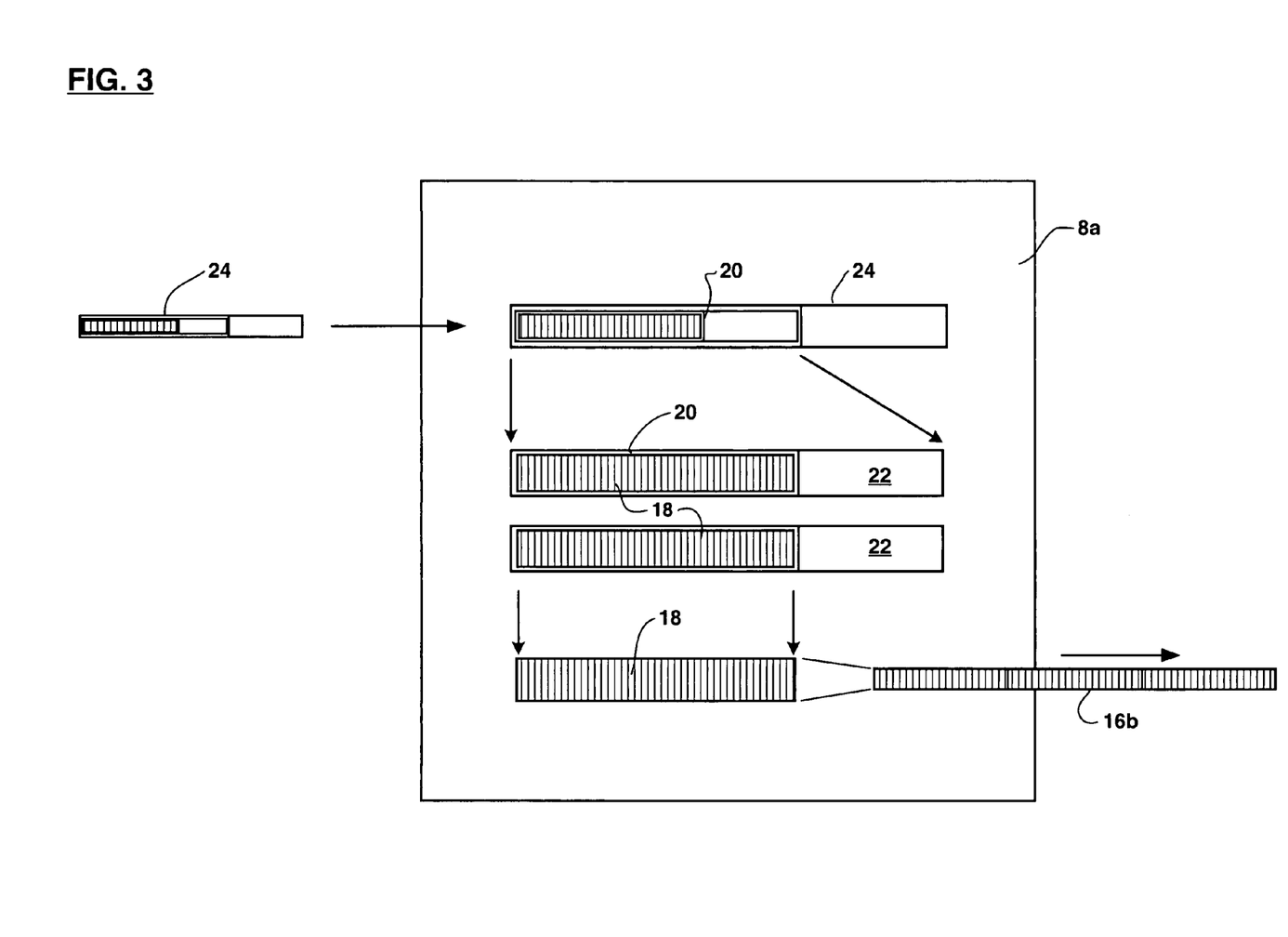
FIG. 3 is a block diagram schematically illustrating reconstruction of a circuit-switched data stream following transport though the broadband packet network of FIG. 1.

As shown in FIG. 3, as each successive PDU 24 is received at the egress gateway 8b, the encapsulated container 20 is extracted from the PDU 24 and buffered (e.g. in a jitter buffer, not shown). If necessary, the buffered containers 20 can be sorted (e.g. on the basis of a sequence number contained in the respective header portion 22 of each container 20). If desired, the inter-frame delay between arrival times of successive PDU's can be monitored, and the length of the jitter buffer adjusted based on changes in the inter-frame delay. Finally, payload packets 18 encapsulated within each successive container 20 are extracted and processed as described below to produce a reconstructed serial byte stream 16b.

Figure 4A:
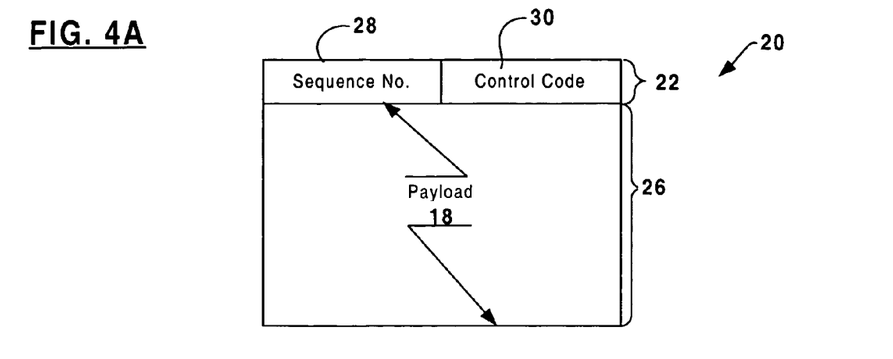
FIGS. 4a through 4c show respective exemplary formats of a container usable in the present invention.
Figure 4B:
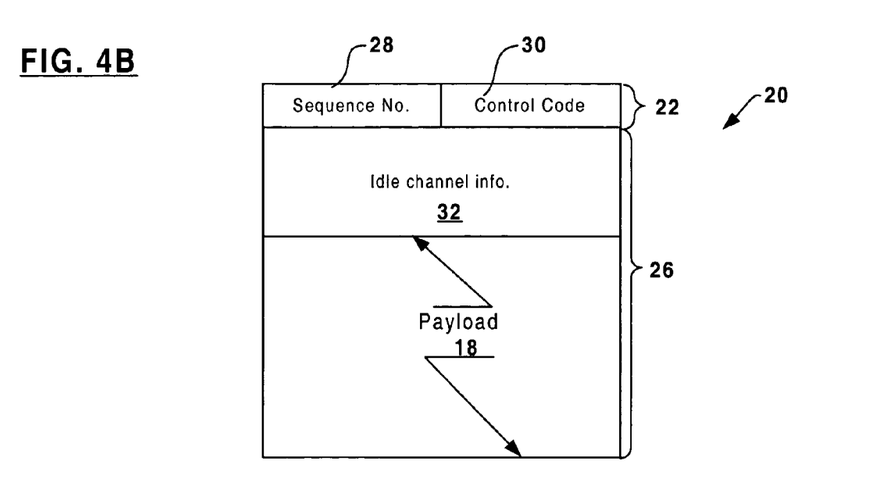
Figure 4C:
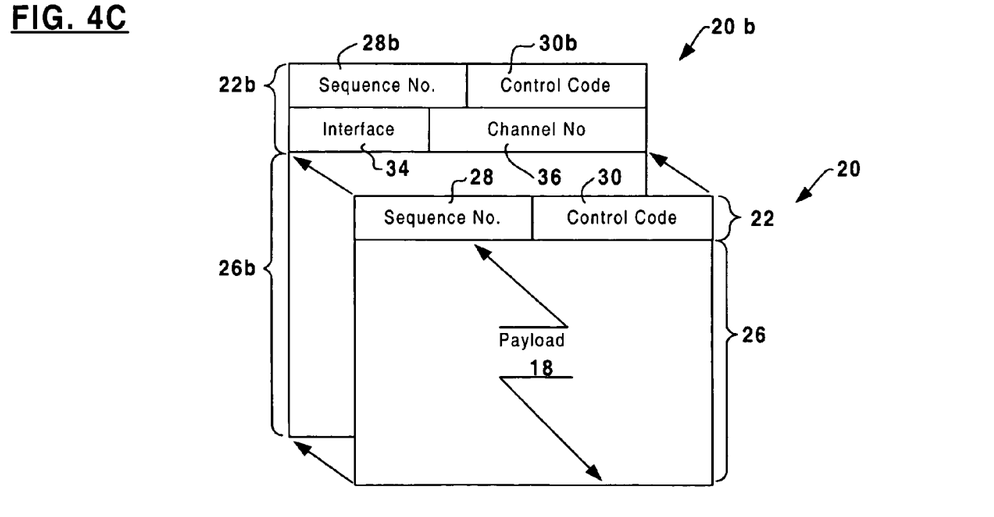

FIGS. 4a through 4c show respective exemplary formats for a container 20 usable in the present invention. As shown in FIG. 4a, each container 20 generally comprises a header portion 22 and a payload portion 26. The header portion 22 includes a sequence number field 28 and a control field 30, each of which may be of a predetermined fixed length (e.g. 4 bits). Similarly, the payload portion 26 is preferably of a predetermined length. In general, the size of the payload portion 26 corresponds to the size of a payload packet 18, which may be arbitrary. However, in embodiments in which legacy data streams are to be treated as frame aligned, or multi-frame aligned data, the size of the payload portion 26 (and thus the payload packet 18) will preferably be based on the provisioned format of the respective interface 10. In particular, legacy signals 16 on a T1 interface 10 are divided into frames, and each frame is subdivided into N time slots. In that case, the payload portion 26 of the container 20 is preferably sized to carry an integer number of frames. Similarly, a multi-frame-aligned data stream is typically formatted as super-frames with each super-frame including a number of frames. If so, the size of the payload portion is preferably selected to accommodate an integer number of super-frames. This arrangement means that, if a container is lost during transport between the ingress and egress gateways 8a,8b, then an integer number of whole frames will be lost, so that problems resulting from sending incomplete frames into the receiving legacy network 4b are avoided. The relationship between frame alignment and payload packet size may be represented by the equation:

$$Ps=(Nc \times Nm) \times n$$

Where:
Ps=payload packet size;
Nc=number of channels per frame;
Nm=number of frames (or super-frames); and
n=an integer.

Thus in general, the size of the payload portion 26 can be selected by provisioning on the basis of the physical interfaces 10 coupled to each of the ingress and egress gateways 8a,8b.

The sequence number field 28 of the container 20 is preferably used to carry a sequence number that is assigned to the container 20 in the ingress gateway 8a, and is used in the egress gateway 8b to ensure proper ordering of buffered containers 20 as well as detection of missing containers. The sequence number may be calculated by any of a variety of known means. For example, the ingress gateway 8a may be provided with a counter (not shown) that is incremented as each successive payload packet 18 is inserted into a respective container 20. The value of the counter can then be used as the sequence number relating to that payload packet 18 and thus inserted into the sequence number field 28 of the corresponding container 20.

As mentioned previously, within the egress gateway 8b, containers 20 are extracted from successively received PDUs 24 and buffered within a memory (not shown). The buffered containers 20 can then be sorted on the basis of their respective sequence numbers to ensure proper sequencing of payload packets 18 for assembly of the reconstructed legacy data stream 16b. Additionally, missing containers (not shown) (e.g. due to non-arrival of a PDU at the egress gateway 8b) can be readily detected by examination of the sequence numbers of buffered containers 20. At least one sequence number (e.g. "0000") may be reserved for specific signaling purposes. For example, a sequence number of "0000" may be inserted by the ingress gateway into the first container of a data stream, to thereby indicate (to the egress gateway 8b) the beginning of a flow of data. This facility can ensure proper reconstruction of the legacy data stream in the egress gateway, even in the event that a notification message (indicating the start of a data flow) is lost.

The control code field 30 is used to convey information regarding the type of data stored in the payload portion 26, and therefore controls the processing of containers and reconstruction of the legacy data stream within the egress gateway. Exemplary control codes are shown in Table 1 below.

| Control Code Value | Meaning |
| --- | --- |
| 0000 | payload includes data |
| 0001 | payload includes idle pattern indication |
| 0010 | unused |
| 0011 | payload includes nx64 idle indication bit map |
| 0100 | payload includes modem status leads |
| 0101 | payload includes fragmented frame |
| 0110 | payload includes end of fragmented frame |
| 0111 | payload includes multiplexing indication |
| 1000 | payload includes message notification |
| 1001-1110 | unused |
| 1111 | go to next byte for control byte |

FIG. 4b illustrates a container which is formatted to include information 32 identifying idle channels within the legacy data stream 16, in addition to a payload packet 18. The idle channel information 32 may be, for example, provided as a bit map (not shown) in which each bit corresponds to a channel of the legacy data stream 16. A value of "1" of a bit may, for example, indicate that the corresponding channel is idle, in which case a value of "0" would indicate that the corresponding channel is in service.

FIG. 4c illustrates a container usable in an embodiment where two or more legacy data streams 16 are multiplexed together at the ingress gateway 8a, and trunked through the broadband packet network 6 to the egress gateway 8b. In this case, each legacy data stream 16 is independently split into fixed length packets 18 which are encapsulated within containers 20 of the type illustrated in FIGS. 4a and 4b. These containers 20 are then encapsulated within a second container 20b which, in addition to a sequence number 28b and control code field 30b, also contains an interface field 34 and a channel number field 36 which enable the encapsulated containers 20 to be extracted and routed within the egress gateway 8b to thereby de-multiplex the packet streams prior to assembly of each of the respective reconstructed legacy data streams 16b.

As mentioned previously, the payload portion of each container 20 encapsulates a fixed length packet 18 of payload data, the size of which may be based on the provisioned format of the physical interface 10a connected to the ingress 8a. The process of packetizing legacy data streams 16 at the ingress gateway 8a is described below with reference to the state diagrams shown in FIGS. 5 through 7.

Figure 5:
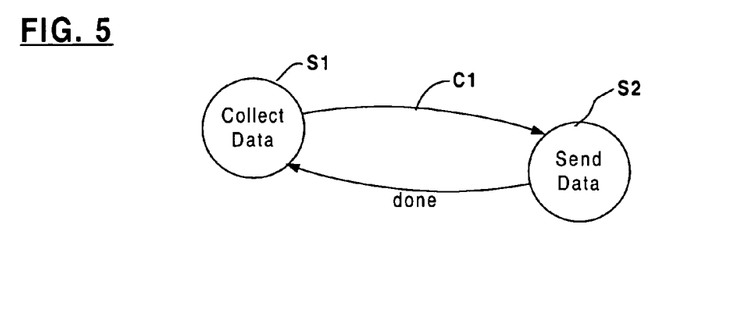
FIG. 5 is a state diagram illustrating operation of the ingress gateway in an embodiment of the invention in which idle suppression is not implemented.

FIG. 5 is a state diagram illustrating operation of the ingress gateway for situations in which a received legacy data stream does not include any idle channels, and embodiments of the invention in which idle channel suppression is not implemented. In this case, successively received bytes of the incoming legacy data stream are accumulated (at S1) in a buffer (not shown) until a predetermined condition C1 is satisfied, at which time the accumulated bytes are encapsulated within a container 20, which is inserted into a PDU 24 for transport across the broadband packet network 6 (at S2). Upon completion of encapsulation of the accumulated bytes, the ingress gateway returns to accumulation of bytes of the incoming legacy data stream 16 within the buffer. The predetermined condition C1 will normally be based on the number of accumulated bytes stored in the buffer corresponding to the predetermined fixed size of each payload packet 18. In some embodiments, the buffer capacity may be provisioned to correspond to the predetermined fixed size of the payload packet 18, in which case the predetermined condition may be detection of the buffer being full. In other cases, the ingress gateway 8a may be provided with a counter (not shown) which operates to count successive incoming bytes (or frames, in the case of provisioned frame-aligned data signals), and the predetermined condition becomes satisfied when the counter reaches a predetermined threshold value.

Figure 6:
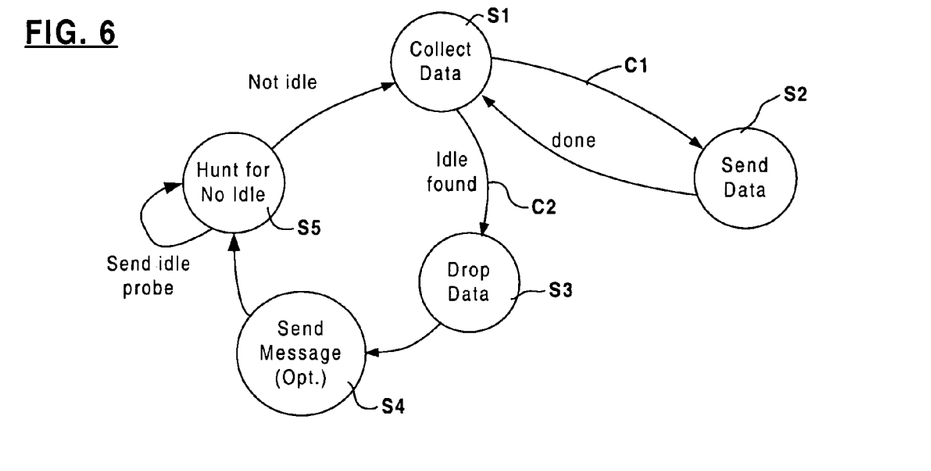
FIG. 6 is a state diagram illustrating operations of the ingress gateway in an embodiment of the invention in which idle suppression is implemented and an idle pattern is known.
Figure 7:
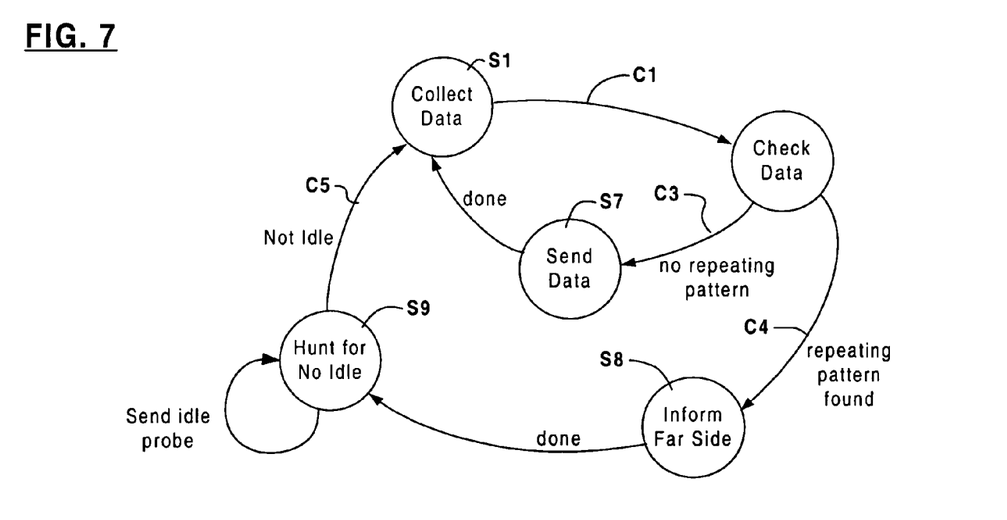
FIG. 7 is a state diagrams illustrating operations of the ingress gateway in an embodiment of the invention in which idle suppression is implemented and an idle pattern is unknown.

FIGS. 6 and 7 are state diagrams illustrating operation of the ingress node 8a in embodiments of the invention that incorporate idle suppression. There are two fundamental reasons why idle suppression is important. The first is to save bandwidth in the broadband packet network 6, and the other is to absorb variations in clocking at the ingress and egress gateways 8a,8b. Since some types of networks (e.g. IP networks) do not support cross-network clock synchronization, the respective gateway clocks may vary. Idle suppression reduces traffic flow through the gateways 8a,8b, and thus allows time for queues in each of the gateways 8a,8b to re-center.

Idle suppression may be implemented in either of two ways: idle suppression where an idle pattern is known; and idle suppression where the idle pattern is unknown. Each of these variations are described below in greater detail with reference to FIGS. 6 and 7 respectively.

FIG. 6 is a state diagram illustrating operations of the ingress gateway where an idle pattern is known. In this case, the idle pattern (e.g. a flag indicating that a channel is idle) is known in advance (e.g. provisioned) and can be detected by the ingress gateway 8a within the received legacy data stream 16. For example, under the HDLC protocol, an idle channel is indicated by a known byte (e.g. 0x7E or 0xFF) which is inserted into the corresponding channel, and never occurs in valid data (i.e. non-idle channels). Thus an idle channel within the data stream 16 can be detected by monitoring each successively received byte. Alternatively, an idle pattern may take the form of a predetermined flag (or byte) that must be repeated a predetermined number of times to indicate an idle channel. For example, a Private Branch Exchange (PBX) may output a predefined byte when the channel is idle. If the ingress gateway 8a detects the byte during a predefined period (or number of successively received frames) the channel may be considered to be idle.

As shown in FIG. 6, when an idle channel is detected at C2, the contents of that channel are dropped (i.e. discarded) at S3 so that only valid data are accumulated in the buffer. Optionally, a message can be sent to the egress gateway 8b (at S4) to indicate the idle channel and/or the idle pattern. This step enables the egress gateway 8b to insert the idle pattern into the buffered containers 20, so that the reconstructed data stream 16b transmitted by the egress gateway 8b fully reflects the contents of the data stream 16 received at the ingress gateway 8a.

The successive bytes received at the ingress gateway 8a can then be checked for the idle pattern (at S5), and, if no idle pattern is detected, the ingress node 8a continues (at S1) accumulating bytes of the data stream 16 in the buffer. As described above in respect of FIG. 5, when the predetermined condition C1 (e.g. buffer full or number of buffered bytes and/or frames) is satisfied, the accumulated data within the buffer is encapsulated into a container 20 for transmission through the broadband packet network 6 within a PDU 24.

For HDLC based data streams, the idle patterns (e.g. either 0x7E or 0xFF) can be removed from the data stream 16 by the ingress gateway 8a, so that only valid data is sent across the network 6. In addition, zero bit deletion/insertion and CRC16 or CRC32 checking can be performed at the ingress gateway 8a if desired. Since the HDLC service must understand the concept of a frame, and because HDLC frames can be quite large, there are two modes in which it can work. These are: Store-and-Forward, and Receive-and-Forward.

In a Store-and-Forward mode, an entire frame is received and validated in the ingress gateway 8a before being encapsulated and sent across the broadband packet network 6. This means that if an error is detected (e.g., invalid CRC) then the frame can be discarded without being encapsulated and sent across the broadband packet network 6.

In a Receive-and-Forward mode, bytes of a frame are encapsulated and forwarded across the broadband packet network 6 as they are received. This means that if an error is detected at the ingress gateway 8a, a control message must be sent across the network 6 to inform the egress gateway 8b to abort the frame. The egress gateway 8b has the option of waiting until the entire frame is received before transmitting, or it may begin part way through receiving the frame from the ingress side 8a.

FIG. 7 is a state diagram illustrating operations of the ingress gateway 8a where an idle pattern is unknown. In this case, the data stream 16 being received at the ingress gateway 8a may be of an unknown type or may not have a predefined idle indicator (e.g. a video transmission or a bisynchronous signal), and thus an idle condition cannot be readily detected within the received data stream 16.

As shown in FIG. 7, successively received bytes are accumulated (at S1) in a buffer (as described above) until the predetermined condition (C1) is satisfied. However, prior to encapsulating the buffered payload packet (S2), the ingress gateway 8a checks (at S6) for the presence of repeating patterns within the buffered payload packet 18. This may be accomplished by ANDing the buffered payload packet 18 with a previous payload packet (not shown), and then analyzing the AND-operation result. If a repeating pattern is not detected (at C3), then the ingress gateway encapsulates and sends the buffered payload packet 18 as described above (state S7). On the other hand, if a repeating pattern is detected (at C4) in a predetermined number of successive payload packets 18, then the ingress gateway 8a determines that an idle condition exists. In this case, the ingress gateway 8a sends an Idle-condition notification message (at S8) to the egress gateway 8b and stops encapsulating payload packets and sending PDUs 24. In response to the Idle-condition notification message, the egress gateway 8b continues assembly of the reconstructed legacy data stream 16b by duplicating the last received payload packet 18. Following the sending of the Idle-condition notification message (S8), the ingress gateway 8a continues hunting for a "no idle" condition (S9), which may, for example, take the form of an absence of repeating patterns within successive payload packets 18. During this time idle probes (e.g. idle notification messages) may be sent to the egress gateway 8b. When the "no idle" condition is found (at C5), encapsulation and forwarding of payload packets resumes (at S1).

Using the above-described container formats and operations within the ingress and egress gateways 8a,8b, various system behaviors are possible, based primarily on the provisioned format of the data streams 16. Exemplary behaviors are described below, for each of unaligned, frame-aligned, and multi-frame-aligned data streams.

Unaligned Data Streams

Because an unaligned data stream is treated as a serial byte-stream, it is possible to trunk data streams across the broadband packet network 6 between gateways 8a,8b having differing interface formats. Thus the present invention is capable of performing format conversions of the data stream 16 as part of the trunking function. For example, a data stream 16 received at the ingress gateway 8a on any interface type (i.e. E1/T1/TTC2M/serial—where serial means V.35, V.11, V.24) can be reconstructed in the egress gateway 8b and transmitted through any other interface type. Only the order of the data is preserved during this conversion.

Provided that the line rates are identical at the ingress and egress gateway interfaces 10a,10b, it is possible to trunk data streams across the broadband packet network 6 between a T1/E1 interface and a serial interface. For example, a frame-aligned data stream having 6 timeslots received through a T1/E1 interface at the ingress gateway 8a can carried across the broadband packet network 6 and reconstructed at the egress gateway 8b as a serial data stream, provided that the line rate of the serial interface is 384 kbit/s.

In embodiments of the invention which include idle suppression, it is possible to trunk data streams between interfaces with different line rates, provided that the effective data rate through the broadband packet network 6 is less than or equal to the slowest line rate. For example, if a communications network 2 in which the ingress gateway 8a has a T1 interface 10a having a line rate of 512 kbit/s, and the egress gateway 8b has a V.35 interface 10b having a line rate of 256 kbit/s. If the effective data rate between the ingress and egress gateways 8a,8b is less than 256 kbit/s, then it would be possible to trunk data across the broadband packet network 6 between these two interfaces 10a,10b.

For an unaligned data stream received through a serial interface, it is possible to carry modem status leads (i.e. RTS/DTR, etc) across the broadband packet network in special PDUs.

Frame Aligned Data Streams

On T1 or E1 interfaces 10, legacy data streams 16 may be treated as frame or multi-frame aligned data streams. When frame aligned data streams are trunked across the broadband packet network 6 between T1 and E1 interfaces 10, the timeslot order as well as the data order is preserved, but multi-frame positioning may be lost. This means that data received at the ingress gateway 8a in timeslot 1 of frame 4 could be located in timeslot 1 of frame 8 of the reconstructed data stream 16b in the egress gateway 8b.

There is no requirement that the timeslot order be the same on each side. Thus data located in timeslots 1, 2 and 3 of the data stream 16a received at the ingress gateway 8a could be located in timeslots 17, 18 and 19 of the reconstructed data stream 16b in the egress gateway 8b. Similarly, there is no requirement that the timeslot order be contiguous on each side. Thus data located in timeslots 1, 2 and 3 of the data stream 16a received at the ingress gateway 8a could be located in timeslots 4, 18 and 23 of the reconstructed data stream 16b in the egress gateway 8b.

Multi-Frame Aligned Data Streams

Multi-frame aligned data is very similar to frame aligned data streams, with the addition that the multi-frame positioning of the data is preserved. This means that data located in timeslot 4 of frame 6 of the data stream 16a received at the ingress gateway 8a is located in timeslot 4, frame 6 of the reconstructed data stream 16b in the egress gateway 8b.

There is no requirement that the timeslot order be the same on each side. Thus data located in timeslots 1, 2 and 3 of the data stream 16a received at the ingress gateway 8a could be located in timeslots 17, 18 and 19 of the reconstructed data stream 16b in the egress gateway 8b. Similarly, there is no requirement that the timeslot order is contiguous on either side. Thus data located in timeslots 1, 2 and 3 of the data stream 16a received at the ingress gateway 8a could be located in timeslots 4, 18 and 23 of the reconstructed data stream 16b in the egress gateway 8b.

Multi-frame aligned data streams can only be trunked between similar interfaces 10. For example, if the ingress gateway 8a receives a multi-frame aligned data stream through a T1 d4 interface 10, it may only trunk that data stream to an egress gateway 8b having a similar T1 d4 interface 10.

During processing of received PDUs 24, the egress gateway 8b operates to identify and extract the AB-bits from each super-frame encapsulated within the container 20. If multiple super-frames are sent across the broadband packet network 6 in a single PDU, then the AB-bits should be extracted from each super-frame, in turn, and saved. These extracted AB-bits are stored for use in an event of frame loss. In particular, in a frame loss situation (i.e., a PDU 24 launched from the ingress gateway 8a fails to arrive at the egress gateway 8b), the stored AB-bits of the last-received super-frame can be inserted into the reconstructed data stream 16b so that multi-frame-alignment of the reconstructed data stream is preserved.

For multi-frame aligned data, the Channel Associated Signaling (CAS) bits may be carried across the broadband packet network 6 imbedded within containers 20 that are also carrying payload packets 18 of the data stream 16. For multi-frame aligned data it is important that the AB-bits be mapped correctly into the correct timeslots of frames 6, 12, 18 and 24 for T1 and timeslot 16 for E1.

The embodiment(s) of the invention described above is(are) intended to be exemplary only. The scope of the invention is therefore intended to be limited solely by the scope of the appended claims.

We claim:

1. A method of extending a data service of a legacy network through a broadband packet network, the method comprising steps of:
    a) at an ingress gateway, accumulating payload data comprising a predetermined number of successive bytes of a data stream respecting the data service independently of a communications protocol of the data stream, the data stream being a legacy data stream originating in the legacy network and received by the ingress gateway through the legacy network;
    b) encapsulating the payload data within a container;
    c) encapsulating the container within a protocol data unit (PDU) of the broadband packet network; and
    d) forwarding the PDU through the broadband packet network to an egress gateway irrespective of routing information contained within the data stream;
    wherein the data stream is a circuit-switched data stream comprising pulse code modulated PCM signals, and the number of accumulated bytes forming the payload data is equivalent to $Ps=(Nc \times Nm) \times n$, where:
    $Ps$=payload data size;
    $Nc$=number of channels of the data stream;
    $Nm$=number of frames of the data stream; and
    $n$=an integer.

2. A method as claimed in claim 1, wherein the step of accumulating payload data comprises steps of:
    a) detecting an idle pattern; and
    b) when an idle pattern is detected, discarding bytes of the data stream corresponding to the detected idle pattern.

3. A method as claimed in claim 2, wherein the idle pattern in known.

4. A method as claimed in claim 3, wherein the idle pattern is embedded within the data stream, and the step of detecting the idle pattern comprises a step of monitoring successively received bytes of the data stream to detect the idle pattern.

5. A method as claimed in claim 3, wherein idle pattern is indicative of an idle channel within the data stream, and the step of discarding bytes of the data stream comprises a step of discarding bytes within the indicated idle channel of the data stream.

6. A method as claimed in claim 3, wherein the idle pattern is a stimulus external to the data stream.

7. A method as claimed in claim 3, further comprising a step of forwarding an idle notification to the egress gateway, the idle notification comprising information identifying detected idle patterns and corresponding idle channels.

8. A method as claimed in claim 7, wherein the notification is forwarded within the container.

9. A method as claimed in claim 7, wherein the notification is forwarded within a notification message independently of the container.

10. A method as claimed in claim 2, wherein the step of detecting the idle pattern comprises a step of monitoring successive payload data to detect a repeating pattern indicative of an idle condition of the circuit-switched data stream.

11. A method as claimed in claim 10, wherein the step of discarding bytes of the circuit-switched data stream comprises a step of discarding successive payload data in which the repeating pattern is detected.

12. A method as claimed in claim 11, further comprising steps of:
    a) interrupting the steps of encapsulating payload data within containers, encapsulating containers within PDUs and forwarding the PDUs to the egress gateway; and
    b) sending an idle notification to the egress gateway.

13. A method as claimed in claim 12, further comprising steps of:
   a) continuing to monitor successive payload data to detect the repeating pattern; and
   b) resuming the steps of encapsulating payload data within containers, encapsulating containers within PDUs and forwarding PDUs to the egress gateway when the repeating pattern is no longer detected.

14. A method as claimed in claim 1, further comprising a step of inserting a sequence number into each successive container.

15. A method as claimed in claim 14, wherein at least one sequence number is a reserved sequence number used to indicate a start of the data stream.

16. A method as claimed in claim 1, further comprising steps of:
   a) receiving sequential PDUs of the broadband packet network at the egress gateway from the ingress gateway;
   b) extracting a respective container from each received PDU; and
   c) reconstructing the data stream using the respective containers.

17. A method as claimed in claim 16, wherein the step of reconstructing the data stream comprises steps of:
   a) buffering each container in a jitter buffer;
   b) extracting a respective payload data from each container; and
   c) appending extracted payload data to payload data of a previous container to reconstruct the data stream.

18. A method as claimed in claim 17, further comprising a step of sorting the buffered containers based on a respective sequence number of each container.

19. A method as claimed in claim 18, further comprising a step of monitoring the respective sequence numbers of each buffered container to detect a missing container.

20. A method as claimed in claim 19, further comprising, in respect of each detected missing container, a step of appending null payload data to previous payload data of the reconstructed data stream.

21. A method as claimed in claim 20, wherein the null payload data comprises AB-bits duplicated from previous payload data of the reconstructed data stream.

22. A method as claimed in claim 17, further comprising a step of
   a) monitoring an inter-packet delay period between successively received PDU's; and
   b) adjusting a length of the Jitter buffer based on the inter-packet delay.

23. A method as claimed in claim 22, wherein the length of the jitter buffer is adjusted during an idle period of the data stream.

24. A method as claimed in claim 16, wherein the step of reconstructing the data stream further comprises a step of receiving an idle notification from the ingress gateway.

25. A method as claimed in claim 24, wherein the idle notification comprises information identifying one or more of an idle indication and a corresponding idle channel of the data stream received by the ingress gateway, and the step of reconstructing the data stream further comprises a step of inserting null data into the corresponding idle channel of the reconstructed data stream following receipt of the idle indication.

26. A method as claimed in claim 25, wherein the null data includes the idle indication.

27. A method as claimed in claim 24, wherein the idle notification comprises an indication of an idle condition of the data stream received by the ingress gateway, and the step of reconstructing the data stream comprises any one or more of duplicating last received payload data, and inserting a provisioned idle pattern.

28. A method as claimed in claim 24, wherein the notification is received by the egress gateway encapsulated within a container.

29. A method as claimed in claim 24, wherein the notification is received by the egress gateway within a notification message independently of a container.

30. A method as claimed in claim 24, further comprising a step of resuming reconstruction of the data stream based on containers extracted from received PDU's upon receipt of a container having a predetermined reserved sequence number.

31. A method as claimed in claim 1, wherein the broadband packet network is based on any one or more of the UDP/IP, TCP/IP, IP-MPLS, ATM, Ethernet and DOCSIS protocols, and the data stream is based on any other communications protocol.

32. An apparatus for extending a data service of a legacy network through a broadband packet network, the apparatus comprising:
   a) means for accumulating payload data comprising a predetermined number of successive bytes of a data stream respecting the data service at an ingress gateway, independently of a communications protocol of the data stream, the data stream being a legacy data stream originating in the legacy network and received by the ingress gateway through the legacy network;
   b) means for encapsulating the payload data within a container;
   c) means for encapsulating the container within a protocol data unit (PDU) of the broadband packet network; and
   d) means for forwarding the PDU through the broadband packet network to an egress gateway irrespective of routing information contained within the data stream;
   wherein the data stream is a circuit-switched data stream comprising pulse code modulated PCM signals, and the number of accumulated bytes forming the payload data is equivalent to $Ps=(Nc \times Nm) \times n$, where:
   Ps=payload data size;
   Nc=number of channels of the data stream;
   Nm=number of frames of the data stream; and
   n=an integer.

33. An apparatus as claimed in claim 32, wherein the means for accumulating payload data comprises:
   a) means for detecting an idle pattern; and
   b) means responsive to detection of an idle pattern and adapted to discard bytes of the data stream corresponding to the detected idle pattern.

34. An apparatus as claimed in claim 33, wherein the idle pattern in known.

35. An apparatus as claimed in claim 34, wherein the idle pattern is embedded within the data stream, and the means for detecting the idle pattern comprises means for monitoring successively received bytes of the data stream to detect the idle pattern.

36. An apparatus as claimed in claim 34, wherein idle pattern is indicative of an idle channel within the data stream, and the means for discarding bytes of the data stream comprises means for discarding bytes within the indicated idle channel of the data stream.

37. An apparatus as claimed in claim 34, wherein the idle pattern is a stimulus external to the data stream.

38. An apparatus as claimed in claim 34, further comprising means for forwarding an idle notification to the egress gateway, the idle notification comprising information identifying detected flags and corresponding idle channels.

39. An apparatus as claimed in claim 38, wherein the notification is forwarded within the container.

40. An apparatus as claimed in claim 38, wherein the notification is forwarded within a notification message independently of the container.

41. An apparatus as claimed in claim 33, wherein the means for detecting the idle pattern comprises means for monitoring each successive payload data to detect a repeating pattern indicative of an idle condition of the circuit-switched data stream.

42. An apparatus as claimed in claim 41, wherein the means for discarding bytes of the circuit-switched data stream comprises means for discarding successive payload data in which the repeating pattern is detected.

43. An apparatus as claimed in claim 42, further comprising:
   a) means for interrupting encapsulation of payload data within containers, encapsulating containers within PDUs and forwarding the PDUs to the egress gateway; and
   b) means for sending an idle notification to the egress gateway.

44. An apparatus as claimed in claim 43, further comprising means for resuming the encapsulation of payload data within containers, encapsulation of containers within PDUs and forwarding of PDUs to the egress gateway when the repeating pattern is no longer detected.

45. An apparatus as claimed in claim 32, further comprising means for inserting a sequence number into each successive container.

46. An apparatus as claimed in claim 45, wherein at least one sequence number is a reserved sequence number used to indicate a start of the data stream.

47. An apparatus as claimed in claim 32, wherein the broadband packet network is based on any one or more of the UDP/IP, TCP/IP, IP-MPLS, ATM, Ethernet and DOCSIS protocols, and the data stream is based on any other communications protocol.

48. An apparatus for extending a data service of a legacy network through a broadband packet network, the apparatus comprising:
   a) means for receiving sequential PDUs of the broadband packet network at an egress gateway from an ingress gateway;
   b) means for extracting a respective container from each received PDU; and
   c) means for reconstructing a data stream respecting the data service using payload data contained within the respective containers, independently of a communications protocol of the data stream, the data stream being a legacy data stream originating in the legacy network and received by the ingress gateway through the legacy network;
   wherein the PDU is routed from the ingress gateway to the egress gateway irrespective of routing information contained within the data stream; and
   wherein the data stream is a circuit-switched data stream comprising pulse code modulated PCM signals, and the number of accumulated bytes forming the payload data is equivalent to Ps=(Nc×Nm)×n, where:
   Ps=payload data size;
   Nc=number of channels of the data stream;
   Nm=number of frames of the data stream; and
   n=an integer.

49. An apparatus as claimed in claim 48, wherein the means for reconstructing the data stream comprises:
   a) a jitter buffer adapted to buffer each container;
   b) means for extracting respective payload data from each buffered container; and
   c) means for appending each extracted payload data to payload data of a previous container to reconstruct the data stream.

50. An apparatus as claimed in claim 49, further comprising means for sorting the buffered containers based on a respective sequence number of each container.

51. An apparatus as claimed in claim 50, further comprising means for monitoring the respective sequence numbers of each buffered container to detect a missing container.

52. An apparatus as claimed in claim 51, further comprising, means for appending null payload data to previous payload data of the reconstructed data stream in respect of each detected missing container.

53. An apparatus as claimed in claim 52, wherein the null payload data comprises AB-bits duplicated from the previous payload data of the reconstructed data stream.

54. An apparatus as claimed in claim 49, further comprising:
   a) means for monitoring an inter-packet delay period between successively received PDU's; and
   b) means for adjusting a length of the jitter buffer based on the inter-packet delay.

55. An apparatus as claimed in claim 54, wherein the length of the jitter buffer is adjusted during an idle period of the data stream.

56. An apparatus as claimed in claim 48, wherein the means for reconstructing the data stream further comprises means for receiving an idle notification from the ingress gateway.

57. An apparatus as claimed in claim 56, wherein the idle notification comprises information identifying one or more of an idle indication and a corresponding idle channel of the data stream received by the ingress gateway, and the means for reconstructing the data stream further comprises means for inserting null data into the corresponding idle channel of the reconstructed data stream in response to receipt of the idle indication.

58. An apparatus as claimed in claim 57, wherein the null data includes the idle indication.

59. An apparatus as claimed in claim 56, wherein the idle notification comprises an indication of an idle condition of the data stream received by the ingress gateway, and the means for reconstructing the data stream comprises means for duplicating last received payload data in response to receipt of the idle notification.

60. An apparatus as claimed in claim 56, wherein the notification is received by the egress gateway encapsulated within a container.

61. An apparatus as claimed in claim 56, wherein the notification is received by the egress gateway within a notification message independently of a container.

62. An apparatus as claimed in claim 56, further comprising means for resuming reconstruction of the data stream based on containers extracted from received PDU's upon receipt of a container having a predetermined reserved sequence number.

63. A system for extending a data service of a legacy network through a broadband packet network, the system comprising:
   a) an ingress gateway comprising:
      i) means for accumulating payload data comprising a predetermined number of successive bytes of a data stream respecting the data service independently of communications protocol of the data stream, the data stream being a legacy data stream originating in the legacy network and received by the ingress gateway through the legacy network;
ii) means for encapsulating the payload data within a container; and
iii) means for encapsulating the container within a protocol data unit (PDU) of the broadband packet network;
b) means for conveying the PDU through the broadband packet network to an egress gateway irrespective of routing information contained within the data stream; and
c) the egress gateway comprising:
i) means for extracting a respective container from each received PDU; and
ii) means for reconstructing the data stream using the respective containers;
wherein the data stream is a circuit-switched data stream comprising pulse code modulated PCM signals, and the number of accumulated bytes forming the payload data is equivalent to $Ps=(Nc \times Nm) \times n$, Where:
Ps=payload data size;
Nc=number of channels of the data stream;
Nm=number of frames of the data stream; and
n=an integer.

64. A system as claimed in claim 63, wherein the means for accumulating payload data comprises:
a) means for detecting an idle pattern; and
b) means responsive to detection of an idle pattern and adapted to discard bytes of the data stream corresponding to the detected idle pattern.

65. A system as claimed in claim 64, wherein the idle pattern in known.

66. A system as claimed in claim 65, wherein the idle pattern is embedded within the data stream, and the means for detecting the idle pattern comprises means for monitoring successively received bytes of the data stream to detect the idle pattern.

67. A system as claimed in claim 65, wherein idle pattern is indicative of an idle channel within the data stream, and the means for discarding bytes of the data stream comprises means for discarding bytes within the indicated idle channel of the data stream.

68. A system as claimed in claim 65, wherein the idle pattern is a stimulus external to the data stream.

69. A system as claimed in claim 65, further comprising means for forwarding an idle notification to the egress gateway, the idle notification comprising information identifying detected flags and corresponding idle channels.

70. A system as claimed in claim 69, wherein the notification is forwarded within the container.

71. A system as claimed in claim 69, wherein the notification is forwarded within a notification message independently of the container.

72. A system as claimed in claim 64, wherein the means for detecting the idle pattern comprises means for monitoring each successive payload data to detect a repeating pattern indicative of an idle condition of the circuit-switched data stream.

73. A system as claimed in claim 72, wherein the step of discarding bytes of the circuit-switched data stream comprises a step of discarding successive payload data in which the repeating pattern is detected.

74. A system as claimed in claim 73, further comprising:
a) means for interrupting encapsulation of payload data within containers, encapsulating containers within PDUs and forwarding the PDUs to the egress gateway; and
b) means for sending an idle notification to the egress gateway.

75. A system as claimed in claim 74, further comprising:
a) means for continuing to monitor successive payload data to detect the repeating pattern; and
b) means for resuming the steps of encapsulating payload data within containers, encapsulating containers within PDUs and forwarding PDUs to the egress gateway when the repeating pattern is no longer detected.

76. A system as claimed in claim 63, further comprising means for inserting a sequence number into each successive container.

77. A system as claimed in claim 76, wherein at least one sequence number is a reserved sequence number used to indicate a start of the data stream.

78. A system as claimed in claim 63, wherein the means for reconstructing the data stream comprises steps of:
a) a jitter buffer adapted to buffer each container;
b) means for extracting respective payload data from each buffered container; and
c) means for appending extracted payload data to payload data of a previous container to reconstruct the data stream.

79. A system as claimed in claim 78, further comprising means for sorting the buffered containers based on a respective sequence number of each container.

80. A system as claimed in claim 79, further comprising means for monitoring the respective sequence numbers of each buffered container to detect a missing container.

81. A system as claimed in claim 80, further comprising means for appending null payload data to previous payload data of the reconstructed data stream in respect of each detected missing container.

82. A system as claimed in claim 81, wherein the null payload data comprises AB-bits duplicated from the previous payload data of the reconstructed data stream.

83. A system as claimed in claim 78, further comprising:
a) means for monitoring an inter-packet delay period between successively received PDU's; and
b) means for adjusting a length of the jitter buffer based on the inter-packet delay.

84. A system as claimed in claim 83, wherein the length of the jitter buffer is adjusted during an idle period of the data stream.

85. A system as claimed in claim 63, wherein the means for reconstructing the data stream further comprises means for receiving an idle notification from the ingress gateway.

86. A system as claimed in claim 85, wherein the idle notification comprises information identifying one or more of an idle indication and a corresponding idle channel of the data stream received by the ingress gateway, and the means for reconstructing the data stream further comprises means for inserting null data into the corresponding idle channel of the reconstructed data stream in response to receipt of the idle indication.

87. A system as claimed in claim 86, wherein the null data includes the idle indication.

88. A system as claimed in claim 85, wherein the idle notification comprises an indication of an idle condition of the data stream received by the ingress gateway, and the means for reconstructing the data stream comprises means for duplicating a last received payload data in response to receipt of the idle notification.

89. A system as claimed in claim 85, wherein the notification is received by the egress gateway encapsulated within a container.

90. A system as claimed in claim 85, wherein the notification is received by the egress gateway within a notification message independently of a container.

91. A system as claimed in claim 85, further comprising means for resuming reconstruction of the data stream based on containers extracted from received PDU's upon receipt of a container having a predetermined reserved sequence number.

* * * * *